(12) United States Patent
Carlson (10) Patent No.: US 7,570,132 B1
(45) Date of Patent: Aug. 4, 2009

(54) SWITCH MATRIX (75) Inventor: Gary Carlson, Aliso Viejo, CA (US)

(73) Assignee: Eads North America Defense Test and Services, Inc., Irvine, CA (US)

( * ) Notice: Subject to any disclaimer, the term of this patent is extended or adjusted under 35 U.S.C. 154(b) by 886 days.

(21) Appl. No.: 11/077,893

(22) Filed: Mar. 11, 2005

(51) Int. Cl.
*H01P 1/10* (2006.01)
*H01R 12/16* (2006.01)
(52) U.S. Cl. ....................... 333/101; 361/768
(58) Field of Classification Search ............ 333/101, 333/103, 104, 105, 262; 361/788
See application file for complete search history.

(56) References Cited

U.S. PATENT DOCUMENTS 7,069,047 B2 * 6/2006 Struhsaker et al. .......... 455/561

* cited by examiner

*Primary Examiner*—Dean O Takaoka (57) ABSTRACT

A switch matrix assembly provides for excellent frequency performance while maintaining good isolation, insertion loss, and crosstalk performance. The switch matrix assembly can include an internal bus connector card that helps eliminate or reduce stubs on a matrix star card that is part of the switch matrix. A stack bus connector card can be added in order to allow for identical busbars on other matrix star cards to be connected "stubless." The switch matrix can also include bus stub isolator card(s) in order for busbar stubs to be broken-off reasonably close to final termination points. The stackable design of the switch matrix assembly allows for a fairly dense design which helps save space, improves serviceability, and improves overall switching performance.

15 Claims, 7 Drawing Sheets

SWITCH MATRIX

FIELD OF THE INVENTION

The invention relates in general to the field of electronics and more particularly to a switch matrix for use in switching electrical signals.

BACKGROUND

Designing a switch matrix that provides for low insertion loss while maintaining excellent isolation and crosstalk performance for use in critical situations as when testing amplifiers, receivers or other active devices is very difficult to accomplish. Switching high frequency signals becomes even harder to accomplish without degrading the signals significantly. As the dimensional size of a switch matrix increases, signal path lengths increase causing a degradation of the electrical signals traveling through the matrix, primarily due to the effects of un-terminated stubbing.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures.

The switch matrix of the present invention provides for a direct current to radio frequency switch matrix that provides electrical interconnection from any point to any and all points in the matrix. High frequency performance is achieved for single point-to-point connections by reducing stubs and packing the matrix in a very dense three dimensional stackable package. The use of multiple stackable cards allows for different switch designs to be implemented, while providing for easy replacement of damaged cards within the matrix.

Figure 1:
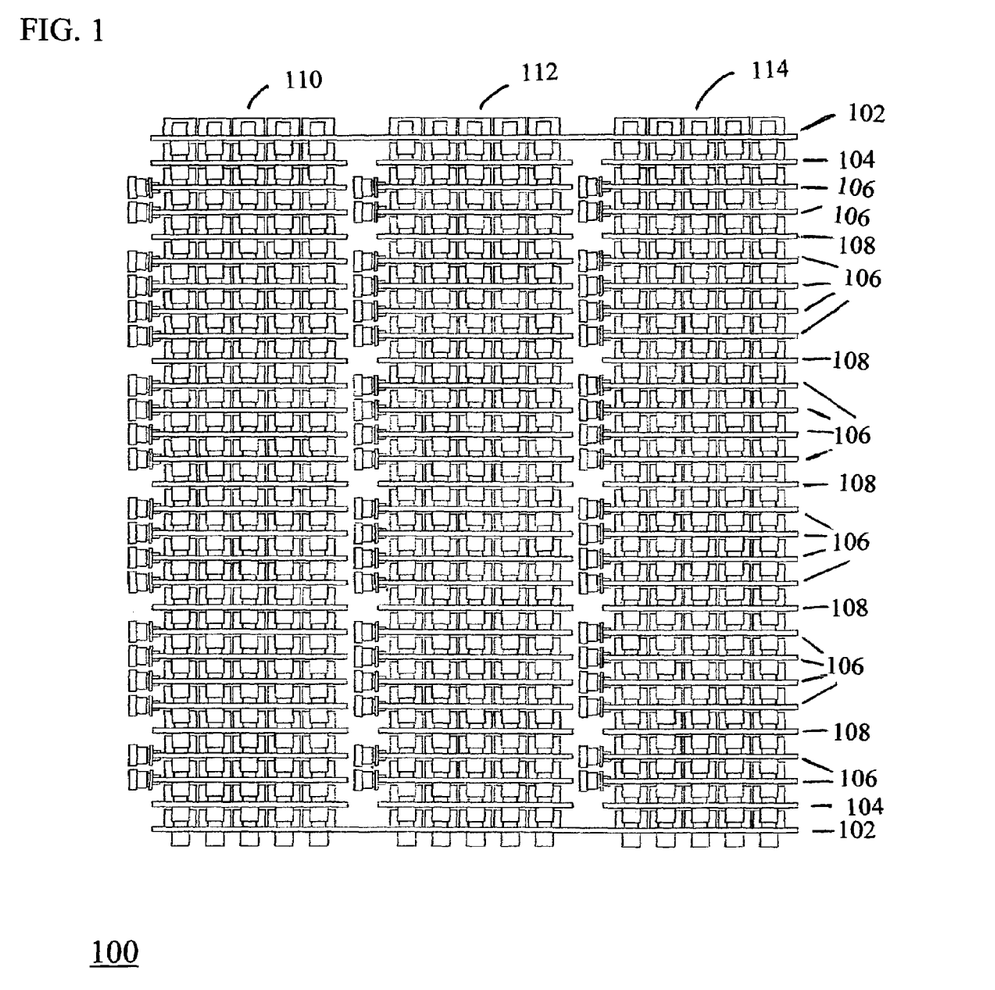
FIG. 1 shows an assembled switch matrix viewed from the edge in accordance with an embodiment of the invention.

Referring now to FIG. 1, there is shown a side view of an assembled switch matrix 100 in accordance with an embodiment of the invention. Switch matrix 100 in the illustrative embodiment comprises a non-blocking, full fan-out switch matrix. Switch matrix 100 includes a pair of stack bus connector cards 102 one at each end of the switch matrix 100. Coupled to the stack bus connector cards 102 are internal bus connector cards 104. The switch matrix 100 also includes a plurality of matrix star cards 106 and bus stub isolator cards 108 stacked together and electrically interconnected as shown.

The switch matrix 100 shown in FIG. 1 takes up an area of approximately 4.6"×8.25"×9.25" providing for a compact design, which is very helpful when performing high frequency switching. The dimensional size of the switch matrix can vary based on design requirements and other factors. It should be noted that although the matrix 100 is shown with a certain number of matrix star cards 106, bus stub isolator cards 108, stack bus connector cards 102 and internal bus connector cards 104, different designs may use different number of cards. The term card is an industry phrase that is used to describe an electrical assembly such as a printed circuit board assembly.

As shown in FIG. 1, matrix 100 includes three columns of internal bus connector cards 104, matrix star cards 106 and bus stub isolator cards 108 located between the two stack bus connector cards 102. The different cards are electrically interconnected with each other using electrical connectors such as radio frequency (RF) connectors that allow for press in connections. The connectors used in one embodiment of the invention are MMCX series RF connectors that provide for snap-on mating and can operate at high frequencies.

The bus stub isolator cards 108 are preferably placed at a minimum of every four matrix star cards 106 or less so that busbar stubs located on the matrix star cards 106 are electrically "broken-off" reasonably close to the final termination points. In the matrix 100 two stack bus connector cards 102 and two internal bus connector cards 104 are located at opposite ends of the assembly in order to reduce the worst case electrical path distance by approximately half. In one embodiment, the switch matrix 100 comprises a single-wire design in order to achieve a 40 MHz bandwidth specification. The single-wire design also helps improve both crosstalk and isolation.

For sake of clarity, the control lines that control the relays found in switch matrix 100 as well as the input and output signal lines have not been shown. In one embodiment all of the cards 102-108 are held together using one or more rods that are slid through apertures found in each of the cards, the end of the rods can accommodate a nut or other fastening device to help retain the rods in place. If one of the cards 102-108 becomes defective, it becomes very easy to replace it by simply unfastening the rods, snapping off one or more of the cards in the stack to reach the defective card and replacing the card. In another embodiment, the stack cards 102-108 can be designed to be cards which can be inserted into a backplane bus. In this embodiment, some of the cards would have edge traces that would allow signal/power lines such as relay control, power and I/O signal lines to interconnect with the cards 102-108.

Figure 2:
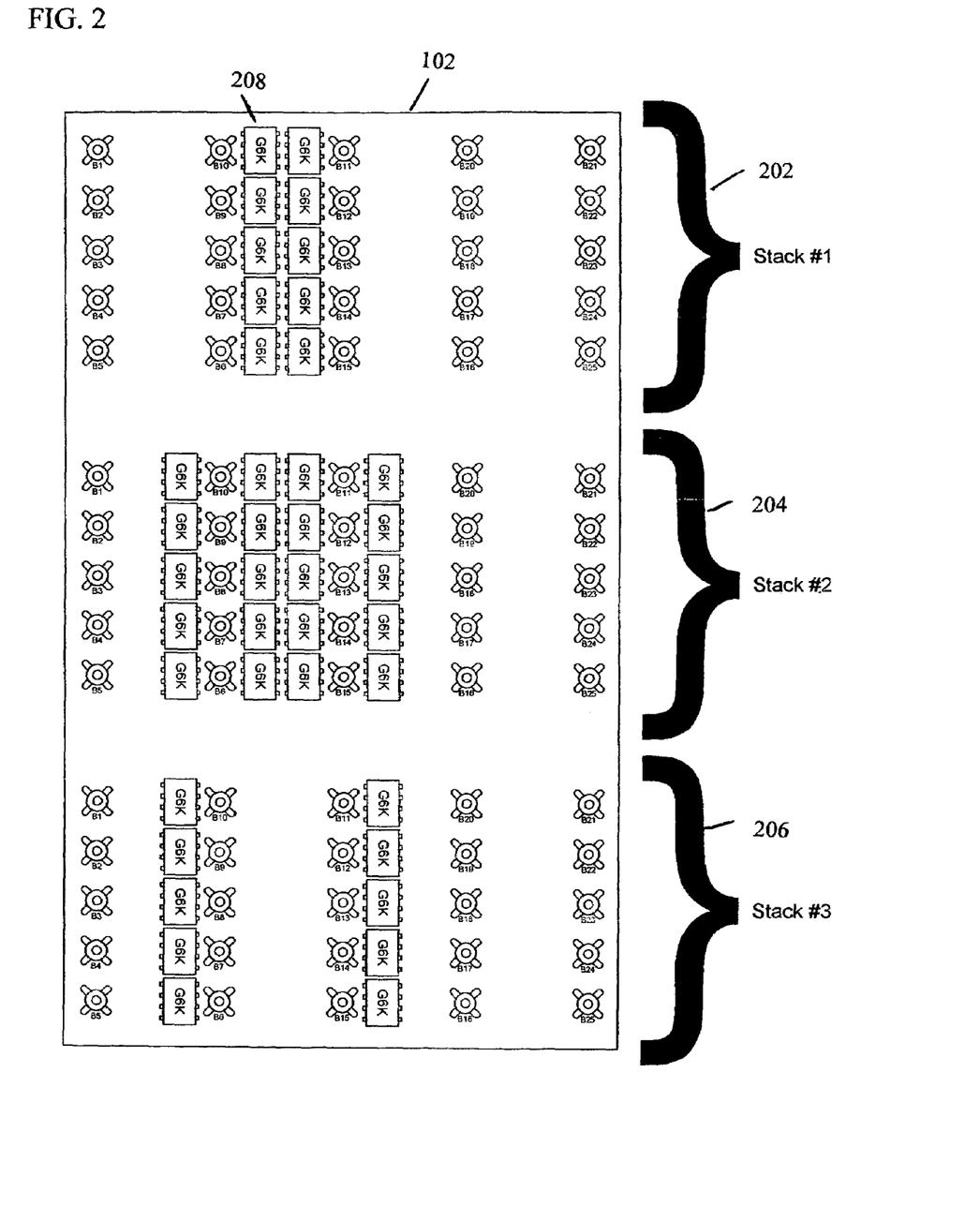
FIG. 2 shows a layout view of a stack bus connector card viewed from the component side in accordance with an embodiment of the invention.

Each of the different stackable cards that make up the switch matrix will now be discussed. Referring now to FIG. 2, there is shown a layout view of the stack bus connector bus card 102. The stack bus connector bus card 102 includes three stack sections 202, 204, 206 for interconnecting with the three columns of cards 110-114 found in the stack matrix 100. Each stack section 202, 204 and 206 as shown includes 25 busbar connectors (B1-B25) which are used to electrically interconnect the different cards. Although three stack sections 202-206 are used in the embodiment being discussed, a different number of stack sections can be included depending on a particular design requirement.

The busbar connectors comprise MMCX series connectors that provide for snap-on mating between connectors from one card to the next in the stack and provide for excellent radio frequency (RF) signal transfer performance at a nominal 50 Ohm impedance. The MMCX connectors are typically soldered onto the printed circuit board and have a very small height, such as less than 0.2 inch. Also found in each of the stack sections 202, 204 and 206 are a plurality of relays 208, section 202 includes 10 relays, section 204 includes 20 relays and section 206 includes 10 relays. In one embodiment the relays are Double-Pole, Double-Throw (DPDT) where the two throws can be placed in series for better isolation or in parallel for better carry current and are rated for one ampere of current, although depending on the design requirements as to what type of signals will be switched; different types of relays can be used. In another embodiment, both throws of the relay could be utilized to switch differential signals by utilizing busbar connectors other than MMCX providing dual coaxial signal paths.

Figure 3:
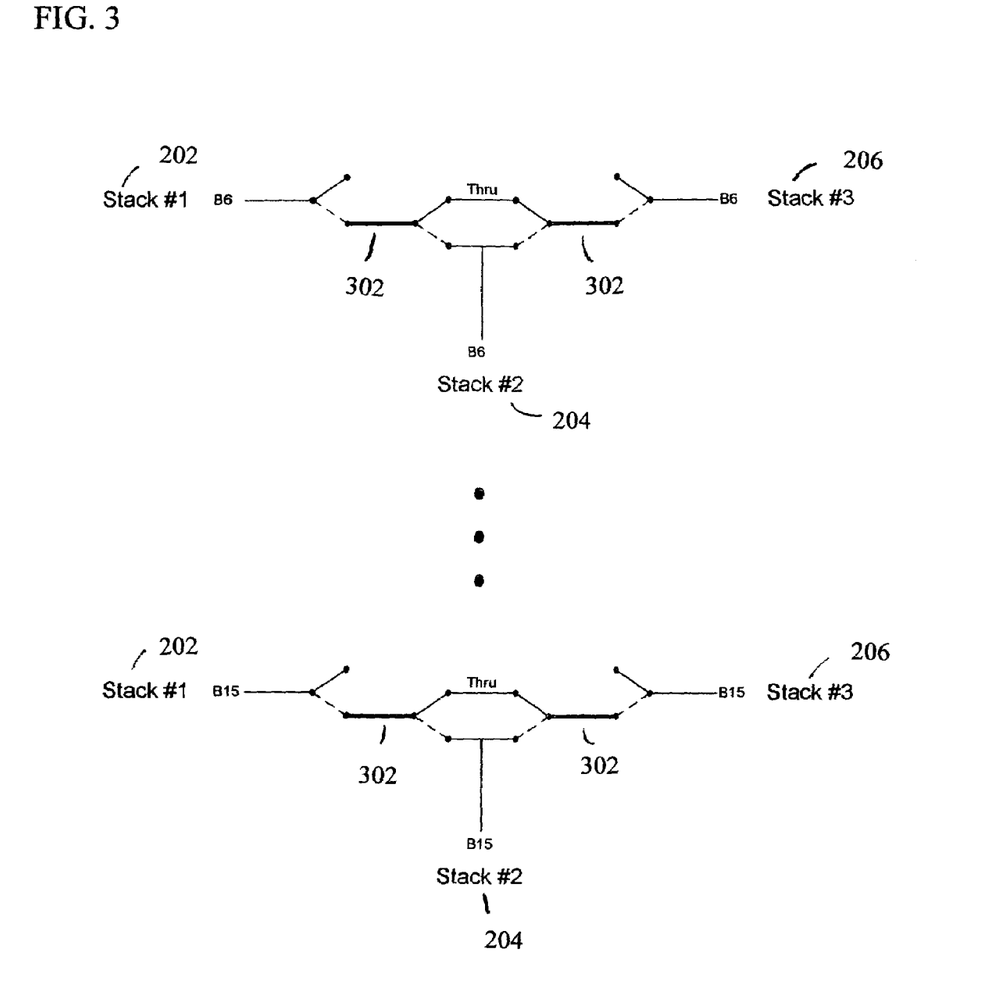
FIG. 3 shows a schematic view of a portion of the stack bus connector card in accordance with an embodiment of the invention.

In FIG. 3, there is shown a schematic view of a portion of the stack bus connector card 102. Busbars B6 through B15 of stacks 202, 204 and 206 can be electrically interconnected to each other as shown. For example, busbars B6 in stack #1 202, busbar B6 in stack #2 204 and busbar B6 in stack #3 206 can be interconnected with each other as shown. The remaining busbars B1-B5 and B16-B25 can also be switched through the stack bus connector card 102, by joining busbars in the internal bus connector card 104. The dashed lines show a selectable interconnection using some of the relays found in the stack bus connector card 102. The selectable interconnects can be selected using an external controller (not shown) coupled to the switch matrix 100. The control lines that control the individual relays are not shown. The selectable interconnections allow for example busbar B6 in stack #1 202 to be electrically interconnected to B6 in stack #2 204 or stack #3 206 or all three to be electrically interconnected to each other for low-frequency or direct current signal routing. Two relays are used to switch between the three corresponding busbars (B6-B15). The schematic view also shows breakable stub interconnections 302 that are available for use for different switching requirements. The stack bus connector card 102 allows for electrical signals to go from one stack 202-206 to another stack, as such allowing for interconnection of any point in the matrix to any other point.

Figure 4:
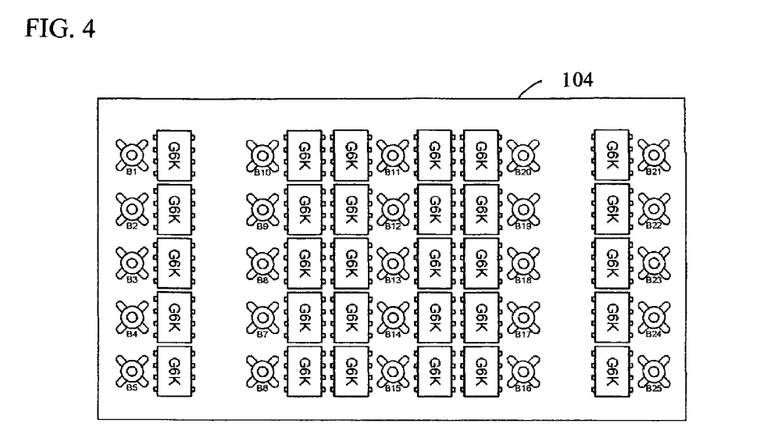
FIG. 4 shows a layout view of an internal bus connector card viewed from the component side in accordance with an embodiment of the invention.

The next card in the switch matrix 100 is the internal bus connector card 104. A layout view of the internal bus connector card 104 is shown in FIG. 4. Each of the internal bus connector cards 104 include 25 busbars B1-B25 that interconnect to the corresponding busbars in the adjoining cards. The internal bus connector card 104 includes 30 relays. The amount of relays and busbars used on the bus connector cards 104 or any of the other cards can of course be adjusted based on particular design requirements. Busbars are shared in the internal bus card 104 of this particular embodiment by using several mathematical relationships. For busbars "n" where n=1 to 5 the sharing relationship is Bn, B(n+10), and B(n+20). For busbars "n" where n=6 to 10 the sharing relationship is Bn and B(n+10). The internal bus card 104 helps improve frequency performance in the switch matrix by minimizing any busbar stubs in a signal path that is selected within the switch matrix 100.

Figure 5:
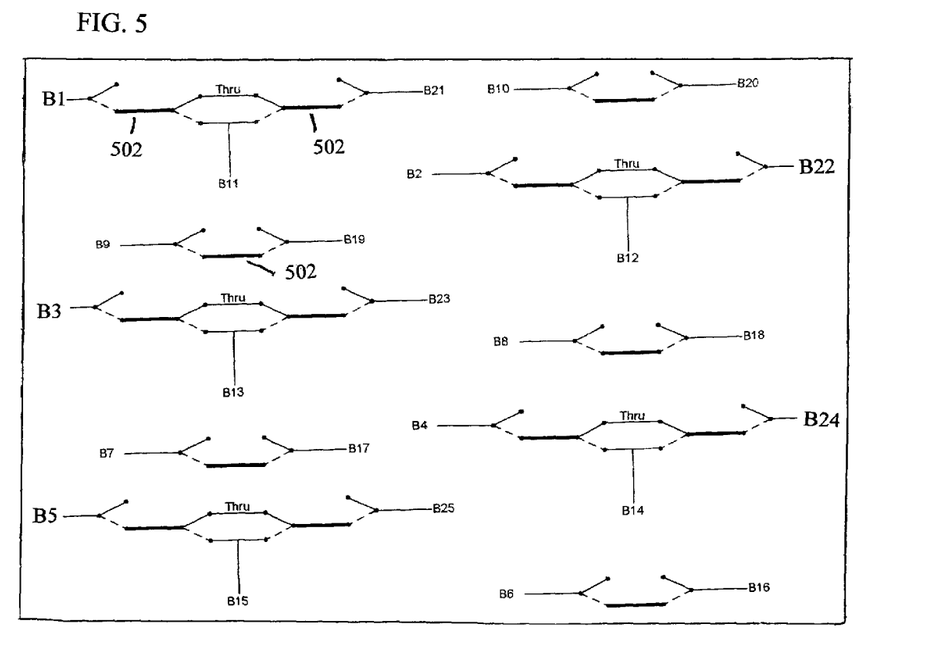
FIG. 5 shows a schematic view of the internal bus connector card.

In FIG. 5 there is shown a schematic view of the internal bus connector card 104. Two relays are used to switch between busbar sets (e.g., B1, B11 and B21, B5, B15 and B25, etc.). Breakable stubs 502 are also provided for further design flexibility.

Figure 6:
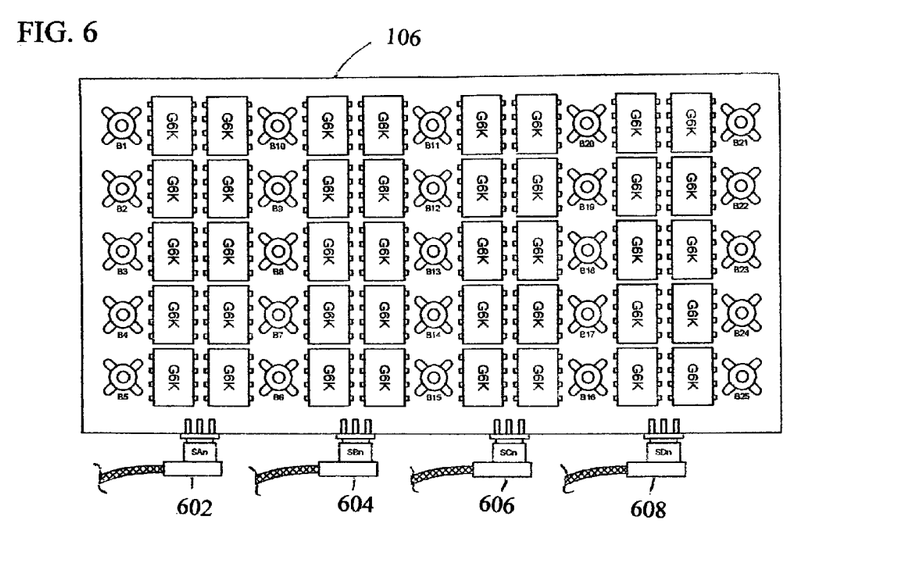
FIG. 6 shows a matrix star card viewed from the component side in accordance with an embodiment of the invention.
Figure 7:
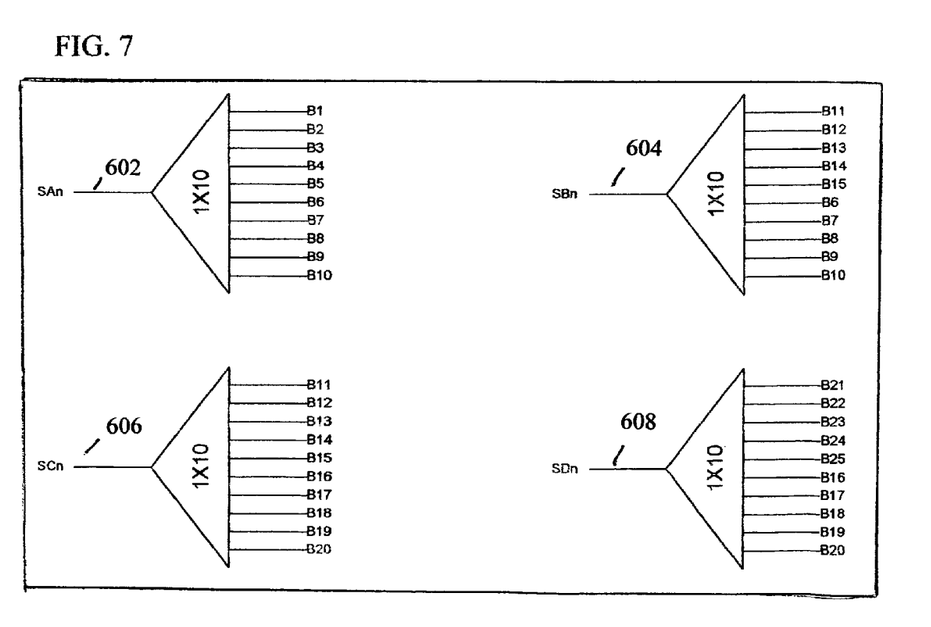
FIG. 7 shows a schematic view of the matrix star card in accordance with an embodiment of the invention.

Referring now to FIG. 6, there is shown a top layout view of a matrix star card 106. The matrix star card 106 shown includes four 1×10 matrixes per card. Signal cables 602-608 are each coupled to one of the four 1×10 matrixes found per card. The electrical schematic for the matrix star card is shown in FIG. 7. The "n" in the I/O pin designators (SAn, SBn, SCn, SDn) refers to the matrix star card reference designator number. In the SAn 602 matrix for example, one of the B1-B10 busbar signal lines is selected to be sent out from the matrix. The B[1:25] electrical nodes are the busbars that run vertically between different matrix star cards 106. When a single matrix star card 106 includes at least one internal bus connector card 104, stubless connections are possible between busbars on a particular matrix star card 106 as previously discussed. This makes it possible to interconnect any I/O pin to any and all busses, and any I/O pin to any all I/O pins located on the same matrix star card stack 110, 112 or 114.

Using at least one stack bus connector card 102 in a switch matrix assembly allows busbars B[6:15] to be connected "stubless" to the identical busbars on other matrix star card stacks 110, 112, 114. In conjunction with the internal bus connector card 104 in each stack, it is possible to electrically interconnect any and all I/O pins to any and all busses and to all other I/O pins in the switch matrix 100.

Figure 8:
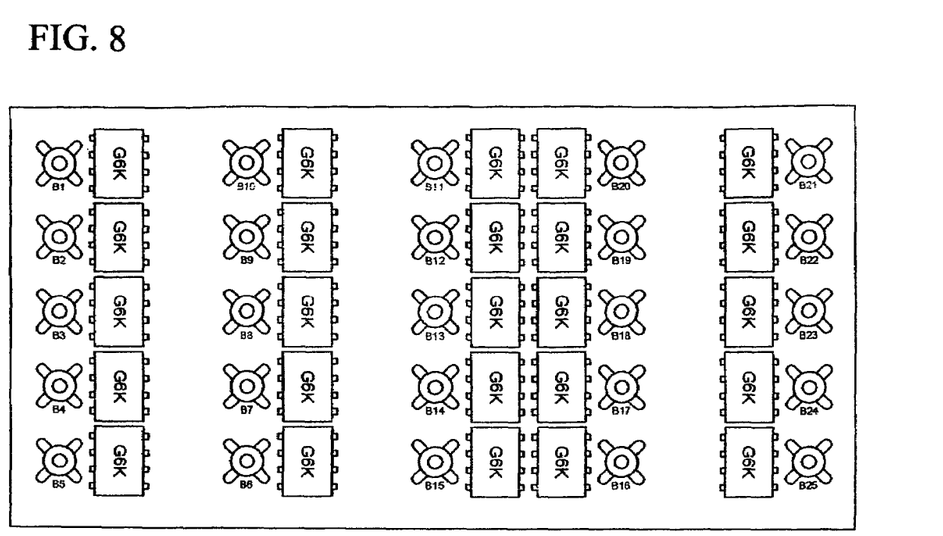
FIG. 8 shows a bus stub isolator card viewed from the component side in accordance with an embodiment of the invention.
Figure 9:
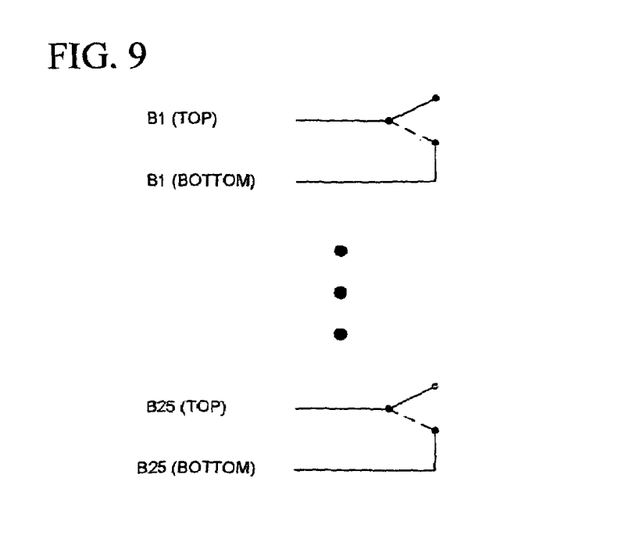
FIG. 9 shows a schematic view of the bus stub isolator card in accordance with an embodiment of the invention.

In FIG. 8, there is shown a top view of a bus stub isolator card 108. The bus stub isolator card 108 helps keep the worst case stub length to as small a length as possible. In one embodiment, the bus stub isolator card 108 helps keep stub lengths to a maximum of 0.5 inch or less. The bus stub isolator cards 108 in the switch matrix cause selectable electrical open circuits to occur between matrix star cards 106 at periodic intervals throughout the switch matrix 100. This is accomplished as shown in the schematic view shown in FIG. 9 by the relays found in the bus stub isolator card 108 which either provide for an electrical connection between the top and bottom portions of B1-B25 or electrically isolate the top and bottom portions of B1-B25 as required. Each of the relays is controlled by a switch matrix controller which is programmed to switch each of the relays in the switch matrix to a state that minimizes path routing distance, minimizes insertion loss, and maximizes frequency performance depending on the path(s) selected.

Figure 10:
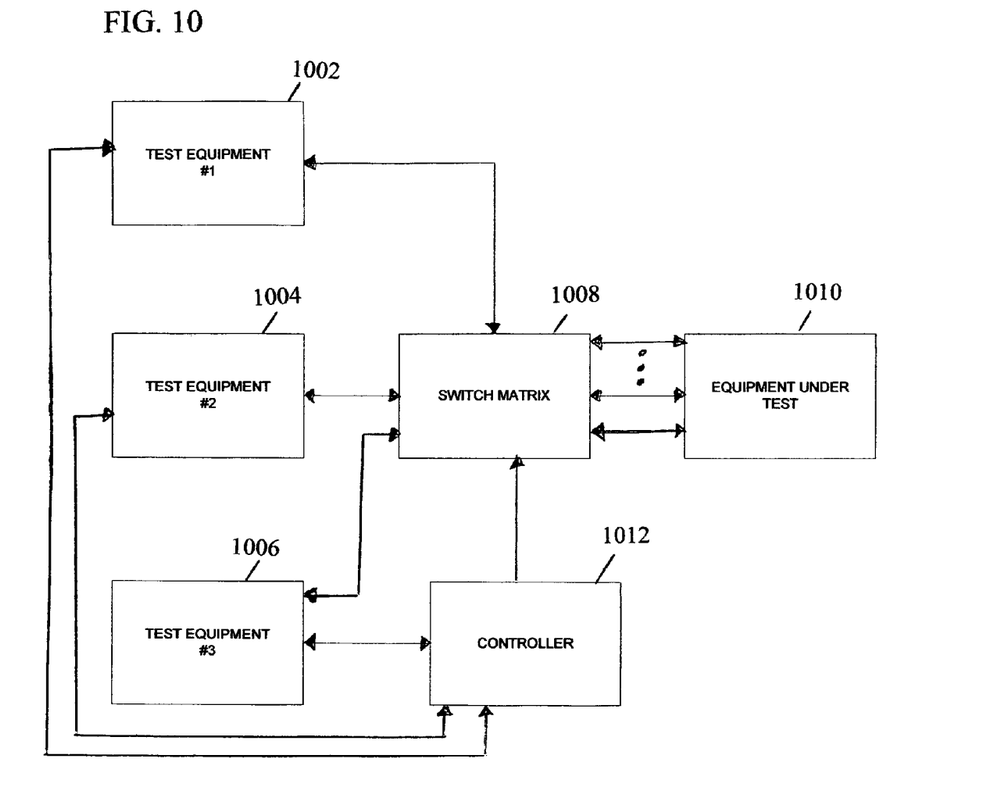
FIG. 10 shows a typical application for this invention which is illustrated in this example as an electronic test system that routes multiple electronic signals from a unit under test to one or more test instruments for measurement and analysis in accordance with an embodiment of the invention.

Referring now to FIG. 10, there is shown an electronic test and measurement system in accordance with an embodiment of the invention. The system includes test equipment 1002-1006 such as automatic test equipment which is under the control of a controller such as a computer. The test equipment 1002-1006 utilized will depend on the type of testing that is required for the equipment under test 1010 (also referred to as a unit under test or UUT). For example, the test equipment 1002-1006 may comprise a programmable power supply, frequency synthesizer and other assorted test equipment. A switch matrix 1008 similar to switch matrix 100 which is under the control of a test equipment controller 1012 provides all the necessary signal switching between the test equipment 1002-1006 and the equipment under test 1010. The equipment under test 1010 can be any electronic device or assembly that requires testing.

The controller 1012 can comprise a personal computer or specialized controller hardware and/or software, or other control equipment. In one embodiment, the controller 1012 programs the test equipment 1002-1006 and selects the switch configuration for switch matrix 1008 during testing. The controller 1012 can also include a display, keyboard, printer and memory for providing an interface to a user and for storage of the test results. The controller 1012 can also be coupled to a computer network so that the test results can be forwarded to a remote site if so required.

Switch matrix 100 provides for a very compact and extremely dense switching matrix. By using bus stub isolator cards 108, the worst case stub is kept to a very short length, thereby providing for improved signal performance. Switch matrix 100 provides for the high frequency performance advantage of a conventional tree switch design and the flexibility of a cross point switch without the problems signal degradation problems caused by stubs.

While the preferred embodiments of the invention have been illustrated and described, it will be clear that the invention is not so limited. For example, although star matrix 100 has been shown with a set number of different cards, different designs can not include all cards, include more cards of a particular type, etc. Numerous modifications, changes, variations, substitutions and equivalents will occur to those skilled in the art without departing from the spirit and scope of the present invention as defined by the appended claims.

What is claimed is:

1. A switch matrix assembly, comprising:
   a matrix star card having a plurality of switch matrixes and a plurality of busbars;
   an internal bus connector card having a plurality of busbars that couple to at least some of the plurality of busbars on the matrix star card, the internal bus connector card providing for stubless connections between different busbars on the matrix star card;
   the plurality of busbars on the matrix star card and the plurality of busbars on the internal bus connector card comprise connectors that provide for snap-on mating; and
   a stack bus connector card having a plurality of busbars for coupling to the internal bus connector card, the stack bus connector card allows busbars on the matrix star card to be connected stubless to identical busbars on other matrix star cards.

2. A switch matrix assembly as defined in claim 1, wherein the connectors comprise radio frequency (RF) connectors.

3. A switch matrix assembly as defined in claim 1, wherein the stack bus connector card includes a plurality of stacks for accepting a plurality of internal bus connector cards.

4. A switch matrix assembly as defined in claim 3, wherein a plurality of matrix star cards can be added to each of plurality of stacks in the stack bus connector card.

5. A switch matrix assembly as defined in claim 4, further comprising a plurality of bus isolator card, at least one coupled to each of the plurality of stacks found in the stack bus connector card.

6. A switch matrix assembly as defined in claim 5, wherein the plurality of bus isolator cards allow for busbars stubs in each of the plurality of stacks to be electrically broken-off close to selected final termination points.

7. A switch matrix assembly as defined in claim 1, wherein the plurality of switch matrixes in the matrix star card are formed using a plurality of relays.

8. A switch matrix assembly as defined in claim 1 wherein the matrix star card and the internal bus card comprise a single-wire design.

9. An electronic test system, comprising:
   one or more test equipment components including a controller;
   a stackable switch matrix controllable by the controller, the stackable switch matrix, comprising:
      a matrix star card having a plurality of busbars that extend from the matrix star card and including a plurality of relays that form an X-by-Y switch matrix;
      an internal bus connector card having a plurality of busbars that electrically mate to the plurality of busbars found in the matrix star card; and
      the plurality of busbars found on the matrix star card and the internal bus connector card comprise radio frequency connectors that provide for snap-on mating; and
   a stack bus connector card having a plurality of stacks, one of the plurality of stacks accepting the internal bus connector card and another one of the plurality of stacks accepting a second internal bus connector card.

10. An electronic test system as defined in claim 9, further comprising a second matrix star card coupled to the second internal bus connector card and the stack bus connector card allows for busbars in the matrix star card and the second matrix star card to be stublessly connected.

11. An electronic test system as defined in claim 10, further comprising:
   a bus stub isolator card coupled to each of the plurality of stacks provided by the stack bus connector card, the bus stub isolator card electrically isolate busbars in each of the plurality of stacks.

12. A stackable switch matrix, comprising:
   a first stack bus connector card having a plurality of vertical busbars and a plurality of stacks which are duplicates of each other;
   a plurality of internal bus connector cards having a plurality of busbars that snap-on mate with the plurality of vertical busbars found in the first stack bus connector card, one internal bus connector card from among the plurality of internal bus connector cards is coupled to each of the plurality of stacks; and
   a plurality of matrix star cards one coupled to each of the plurality of internal bus connector cards, each of the plurality of matrix star cards having a plurality of switch matrixes.

13. A stackable switch matrix, as defined in claim 12, wherein the first stack bus connector card allows for busbars to be switchably coupled in a stubless fashion to corresponding busbars found in the plurality of matrix star cards.

14. A stackable switch matrix as defined in 13, further comprising at least one bus stub isolator card electrically coupled to each of the stacks formed by the first stack bus connector card, the bus stub isolator cards allow for busbars in the matrix star cards to be electrically terminated close to the final switching termination points.

15. A stackable switch matrix as defined in claim 14, further comprising:
   a second stack bus connector card located at the opposite end of the first stack bus connector card, the second stack bus connector card helps reduce the worst case path distance.

* * * * *